(No Model.)
W. P. BALL.
DIRT SCRAPER.
No. 474,896. Patented May 17, 1892.
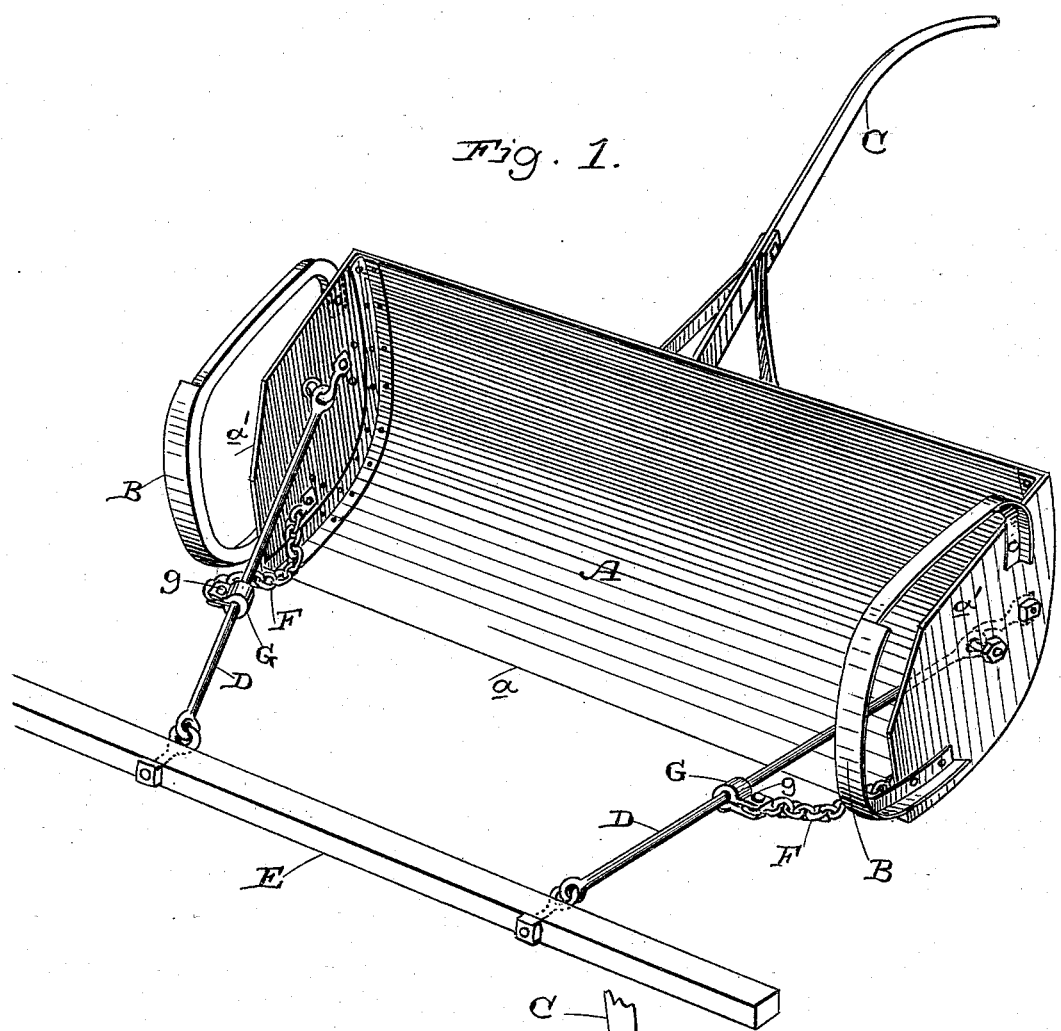
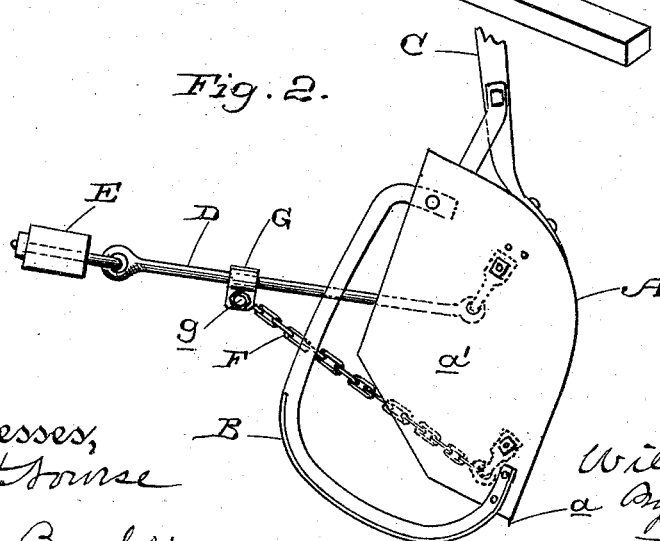
Witnesses,
G. H. House
J. A. Bayless
Inventor,
William P. Ball
By Davey & Co.
Attys

United States Patent Office.

WILLIAM PERRY BALL, OF FRESNO, ASSIGNOR TO TRUMAN HOOKER & CO., OF SAN FRANCISCO, CALIFORNIA.

DIRT-SCRAPER.

SPECIFICATION forming part of Letters Patent No. 474,896, dated May 17, 1892.

Application filed December 1, 1891. Serial No. 413,710. (No model.)

*To all whom it may concern:*

Be it known that I, WILLIAM PERRY BALL, a citizen of the United States, residing at Fresno, Fresno county, State of California, have invented an Improvement in Dirt-Scrapers; and I hereby declare the following to be a full, clear, and exact description of the same.

My invention relates to that class of dirt-scrapers provided with a bowl adapted to be turned by a rearwardly-projecting handle, said bowl being connected by draft rods or links with a draft-bar in front.

My invention consists in the novel connections for limiting the dump of the bowl hereinafter fully described, and specifically pointed out in the claim.

The general object of my invention is to provide means for enabling the operator to turn the bowl to any point which he may desire, whereby its contents may be discharged in greater or less volume over the ground, and may be equally spread thereon.

The particular object is to provide for limiting connections arranged with respect to the bowl and to its connected parts in such a way as to provide for simplicity, economy, and general effectiveness and ease of adjustment.

Referring to the accompanying drawings for a more complete explanation of my invention, Figure 1 is a perspective view of my scraper. Fig. 2 is an end view showing it in a dumped position.

A is the bowl of my scraper, having the bit $a$ and the ends $a'$, to which are secured the usual runners B. The bowl is provided with the rearwardly-extending handle C by which it is operated. Connected with each end of the bowl is a draft link or rod D, the forward end of which is connected with the draft-bar E, to which the team is to be attached.

F are my limiting-chains. These are short pieces, and are connected at their rear ends either with the bowl itself or with the ends of the bowl, as here shown. Their forward ends are connected with the draft links or rods D. This connection, though it may be a fixed one, is better an adjustable one, and it may be made in any suitable manner whereby the length of the chain may be regulated; but I prefer the means here shown, which consist of clips G, mounted upon the links or rods and adapted to be moved back and forth thereon, and secured in the position to which they are adjusted by the bolts $g$. To these adjustable clips the forward ends of the chains are secured.

Now it will be seen that when the scraper is in operation its bit or cutting-edge $a$ will travel in the ground and the bowl will receive its load. When the scraper has reached the point at which it is desired to dump the load, the operator lifts up on the handle, thereby turning the bowl. The bowl turns until it is limited by the chains F, which will allow it to turn no farther, and this limit is a variable one, as desired, by adjusting the connection of the forward ends of the chains with the links or rods D. Thus by setting the clips G forward on the links or rods, the chains are so tightened up that they will allow the bowl to dump or turn only to a certain point, and by setting the clips on the rods closer to the bowl the chains will be slack enough to allow the bowl to turn farther. In the first instance, the bit of the bowl will be removed from the ground only a short distance, and will therefore allow but a gradual discharge of its contents which will be spread over the ground in a comparatively thin layer. In the second instance the bit of the bowl will be raised higher from the ground, allowing a more rapid discharge and a thicker layer.

The chains, being connected with the draft-links, may be made comparatively short and will not be in the way in operation. The attachment of the rear ends of the chains to the bowl proper is also of advantage in keeping them out of the way.

Having thus described my invention, what I claim as new, and desire to secure by Letters Patent, is—

In a dirt-scraper, the combination of the turnable bowl, the draft rods or links secured thereto, the chains secured at their rear ends to the bowl, and the adjustable or sliding clips mounted upon the rods or links and to which the forward ends of the chains are secured, substantially as herein described.

In witness whereof I have hereunto set my hand.

WILLIAM PERRY BALL.

Witnesses:
W. G. CULBERT,
E. M. MORGAN.